Patented Aug. 7, 1945

2,381,457

UNITED STATES PATENT OFFICE 2,381,457

CONDENSATION PRODUCTS AND METHODS OF PREPARING AND USING SAME

Eugene Lieber, West New Brighton, Staten Island, and Marvin E. Thorner, Brooklyn, N. Y., assignors to Standard Oil Development Company, a corporation of Delaware No Drawing. Application November 18, 1941, Serial No. 419,602

3 Claims. (Cl. 252—52)

This invention relates to a novel type of condensation products and to methods of preparing such products and using them for various purposes, more particularly as pour depressors in waxy lubricating oils.

Broadly, the invention comprises the production of condensation products which have wax-modifying properties by condensing a low molecular weight aliphatic oxide with an aromatic compound. This condensation is preferably carried out by the use of Friedel-Crafts catalysts according to procedures commonly used for effecting such condensations.

The aliphatic oxides to be used are preferably lower alkylene oxides having a total of less than 10 carbon atoms. Such alkylene oxides may be considered as chemical compounds having the general formula

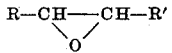

in which R and R' are either alkyl hydrocarbons or hydrogen and they may be similar or dissimilar. The R and R' together preferably have less than 6 carbon atoms. Some specific examples of suitable aliphatic oxides coming within the scope of the above description are the following: amylene oxide, butylene oxide, propylene oxide, ethylene oxide, and even some slightly higher in molecular weight.

The aromatic compounds to be used as the other primary starting material for the chemical condensation of this invention are preferably hydrocarbons and especially condensed poly-nuclear hydrocarbons, although, if desired, one may also use other ring compounds of the benzene or diphenyl type, as well as various alkyl, hydroxy, amino, etc. derivatives of aromatic hydrocarbons. Some specific examples of suitable materials include naphthalene, benzene, toluene, xylene, amyl benzene, phenol, diphenyl, aniline, anisole, diphenyloxide, dibenzyl oxide, alpha or beta naphthol, alpha or beta naphthylamine, anthracene, phenanthrene, picene, or compounds containing two or more different substituents, such as amino-toluene or hydroxy toluene, etc. The aromatic compounds to be used should contain one or more replaceable hydrogen atoms on the aromatic nucleus and it is preferable that the aromatic nucleus should not have more than two substituents already attached thereto.

The proportions in which the lower alkylene oxides and the aromatic compounds should be mixed for carrying out the chemical condensation of this invention may vary over a substantially wide range, such as about 0.5-10 mols, preferably 2-4 mols, of alkylene oxide per mol of aromatic compound.

Although it is possible to carry out this chemical condensation without the use of any inert solvent or diluent, it is preferable that such a liquid medium be used, such as a heavy naphtha or kerosene which may, if desired, be pretreated with sulfuric acid or aluminum chloride or some other suitable material to make it inert, or suitable chlorinated hydrocarbon compounds, e. g., tetrachlorethane, which are inert under the reaction conditions used for carrying out this condensation. If a solvent or diluent is used the amount thereof should be about ½ to 10 volumes, preferably about 1-5 volumes, per volume of mixed reactants.

To effect the condensation it is preferable to use a Friedel-Crafts catalyst, preferably anhydrous aluminum chloride, although other Friedel-Crafts catalysts can be used, such as boron fluoride, zinc chloride, ferric chloride, titanium tetrachloride and boron trichloride. The amount of catalyst to be used will, of course, depend to some extent upon the relative reactivity of the particular reactants, as well as the amount of solvent and the temperature and time. Normally, however, it will be about 0.1-3 mols and usually about 0.5-2 mols per mol of lower alkylene oxide.

In carrying out the invention, a substantial variation in procedure may be used without departing from the scope of the invention. For instance, the order of adding the reactants and catalysts may be varied, as, for example, adding the catalyst last or adding the alkylene oxide last.

The reaction conditions of temperature and time will, of course, depend upon the reactivity of the reactants and upon the relative amount of catalyst and solvent but usually a temperature ranging from about room temperature up to about 300° F., but preferably not above 250° F., may be employed, the reaction time depending upon the other variables being usually between about ½ hour and 10 hours, with about 1-4 hours being the usual time required.

After the condensation has been completed, the reaction mixture is preferably cooled and diluted with a suitable volatile, inert solvent, preferably the same as the diluent used during the reaction if one was used, and then the catalyst is hydrolyzed or neutralized by any of the methods commonly used in Friedel-Crafts reactions, as, for instance, treating the reaction mixture with water, a dilute aqueous solution of caustic soda, alcohol, or a mixture of water and alcohol. The mixture is then settled or otherwise separated into a solvent layer and an aqueous or sludge layer, which latter is removed. The solvent or extract layer is then subjected to distillation with fire and steam or with vacuum, e. g., about 5-50 mm. mercury absolute pressure, up to a final temperature of about 500° F. or 600° F., in order to remove the solvent and low-boiling products and to leave the desired high molecular weight condensation product as distillation residue.

This condensation product, which is generally resinous in nature but may occasionally be in the form of a viscous oil and has a color ranging from a reddish-green to a brown or black and may be viscous, stringy, or brittle, is soluble in mineral oils and has the property of modifying the crystal structure of wax, such as paraffin wax, when added to compositions containing the same. For instance, when about 0.5-10%, preferably 0.2-5%, of this wax modifier is added to a waxy lubricating oil, such as a Pennsylvania or other paraffinic type of lubricating oil having a relatively high pour point, the resultant blend will have a substantially lower pour point. In other words, this wax modifier is an effective pour depressor for waxy oils.

Although the exact mechanism of the operation of this invention and the exact nature of the chemical structure of the resulting products are not well understood, it is believed the lower alkylene oxide condenses with the aromatic compound in some way as to have an interlinking effect so as to build up products of a two or three dimensional or chain type structure, and also to some extent having alkyl groups attached as side chains to one or more of the aromatic nuclei in the high molecular weight chain type product. Its molecular weight appears to be in the range of about 500-1500.

A small amount of this wax modifier is also useful as a dewaxing aid for removing wax from mineral lubricating oils of undesirably high wax content, and in similarly small amounts this wax modifier may also be incorporated into paraffin wax or compositions containing the same to be used for various purposes, such as for coating or impregating paper, etc., or for making various molded products.

If desired, this condensation product may also be added in small amounts to other petroleum fractions, such as lubricating oils derived from naphthenic or mixed base crudes, or to naphtha, kerosene, fuel oil, Diesel fuel, etc.

For the sake of illustration but without intending to limit the invention to the particular materials used or to the particular reaction conditions used, some experimental data are given herewith. Only the first example will be described in detail in narrative form and then all of the experimental data are summarized in a table indicating the kinds and proportions of materials used, as well as reaction conditions and the nature of the resulting product, so that the differences between various examples can be readily observed.

Into a 3-liter-4-neck, round bottom flask fitted with a mechanical stirrer, reflux condenser, thermometer and dropping funnel were placed 58 grams of propylene oxide having the chemical formula

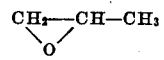

128 grams of naphthalene and 500 cc. of kerosene (heavily treated with sulfuric acid before use) as solvent. Means were provided for cooling and heating the reaction flask. The mechanical stirrer was started and while maintaining a temperature of 80° F., 135 grams of anhydrous $AlCl_3$ were slowly added to the reaction mixture. After the addition of the $AlCl_3$ the reaction mixture was heated to 150° F., and maintained thereat for 4 hours, after which time it was diluted with a further quantity of kerosene, cooled to 100° F., and the $AlCl_3$ destroyed by slowly adding 500 cc. of a mixture of isopropyl alcohol and water. After settling and removal of the catalyst sludge, the kerosene extract was washed free of acid and then distilled with fire and steam to 600° F., in order to remove solvent and low-boiling products. A bottoms residue comprising 121 grams of a brown, stringy resin was obtained as product.

In other examples the proportions of propylene oxide and naphthalene were varied, some other aromatic compounds were used, various amounts of aluminum chloride were used and in some cases tetrachlorethane was used instead of kerosene as solvent, and finally in a number of cases the propylene oxide was added last instead of adding the aluminum chloride last. In all the tests the same temperature and time of reaction were used.

*Table I*

| Test No. | Propylene oxide, g. | Aromatic compound | | Solvent | | $AlCl_3$, g. | Yield, g. | Pour point, °F.[1] | Color |
|---|---|---|---|---|---|---|---|---|---|
| | | Name | G. | Kerosene | Trichlorethane | | | | |
| 1 | 58 | Naphthalene | 128 | 500 | | [2]135 | 121 | 0 | Br. stringy resin. |
| 2 | 58 | ---do--- | 128 | | 500 | [2]135 | 78 | 0 | Dark resin. |
| 3 | [2]58 | ---do--- | 128 | 500 | | 200 | 105 | -5 | Brown resin. |
| 4 | [2]58 | ---do--- | 128 | 500 | | 200 | 116 | -5 | Black brittle resin. |
| 5 | [2]90 | ---do--- | 100 | | 500 | 200 | 78 | -10 | Do. |
| 6 | [2]36 | Amyl naphthalene | 120 | | 500 | 168 | 88 | -15 | Do. |
| 7 | 90 | Naphthalene | 100 | 500 | | [2]200 | 82 | -25 | Do. |
| 8 | [2]87 | Anthracene | 89 | 500 | | 198 | 102 | -5 | Black resin. |
| 9 | [2]87 | Tetralin | 198 | 500 | | 198 | 100 | -5 | Red-gr. visc-stringy oil. |
| 10 | [2]87 | Chrysene | 100 | 500 | | 200 | 117 | -10 | Brown resin. |
| 11 | [2]87 | Fluorene | 100 | 500 | | 200 | 104 | 0 | Do. |

[1] A. S. T. M. pour point of 2% blend in waxy lube oil having pour point of +30° F.
[2] Added last.

It is noted from the above table that the condensation products of this invention are important pour depressors, 2% thereof reducing the pour point of waxy lubricating oil from +30° F. down to temperatures from 0° F. to −25° F., or lower.

It is not intended that this invention be limited to any of the specific examples which were given merely for the sake of illustration, nor unnecessarily to any theory of the mechanism of the operation of the invention but only by the appended claims in which it is intended to claim all novelty inherent in the invention as well as equivalents coming within the scope and spirit of the invention.

We claim:

1. A composition comprising a major proportion of a mineral lubricating oil and a small amount of a Friedel-Crafts condensation product of an alkylene oxide having less than 10 carbon atoms with an aromatic compound adapted to Friedel-Crafts condensation through replaceable hydrogen atoms on the aromatic nucleus selected from the group consisting of aromatic hydrocarbons and alkyl, hydroxy and amino derivatives thereof, said condensation product being substantially non-volatile at temperatures up to about 600° F. under fire and steam distillation and having pour depressing properties.

2. A composition comprising a major proportion of a waxy mineral lubricating oil and a small but pour depressing amount of a high molecular weight Friedel-Crafts condensation product of propylene oxide and naphthalene, said condensation product being substantially non-volatile at temperatures up to about 500° F. under fire and steam distillation and having pour depressing properties.

3. A lubricant comprising a major proportion of a waxy mineral lubricating oil having dissolved therein a pour-depressing amount between the approximate limits of 0.5 and 5.0% of a high molecular weight Friedel-Crafts condensation product of an alkaline oxide having 2 to 7 carbon atoms with a polynuclear aromatic hydrocarbon adapted to Friedel-Crafts condensation through replaceable hydrogen atoms on the aromatic nucleus, said condensation product being substantially non-volatile up to about 500° F. under fire and steam distillation.

EUGENE LIEBER.
MARVIN E. THORNER.